(12) United States Patent
Lardy et al.

(10) Patent No.: US 10,082,143 B2
(45) Date of Patent: Sep. 25, 2018

(54) COMPACT PACKAGE DESIGN FOR COMPRESSION SYSTEM

(75) Inventors: Pascal Lardy, Houston, TX (US); Pierre Jean, Manneville la Raoult (FR); Frederic Marteau, Octeville sur Mer (FR); Guillaume Carpentier, Le Havre (FR)

(73) Assignee: DRESSER-RAND COMPANY, Olean, NY (US)

( * ) Notice: Subject to any disclaimer, the term of this patent is extended or adjusted under 35 U.S.C. 154(b) by 623 days.

(21) Appl. No.: 14/111,268

(22) PCT Filed: Apr. 13, 2011

(86) PCT No.: PCT/IB2011/001045
§ 371 (c)(1),
(2), (4) Date: Feb. 19, 2014

(87) PCT Pub. No.: WO2012/140461
PCT Pub. Date: Oct. 18, 2012

(65) Prior Publication Data
US 2014/0161638 A1 Jun. 12, 2014

(51) Int. Cl.
*F04D 13/00* (2006.01)
*E04H 5/02* (2006.01)
(Continued)

(52) U.S. Cl.
CPC ............. *F04D 13/00* (2013.01); *E04H 5/02* (2013.01); *F16M 1/00* (2013.01); *F16M 5/00* (2013.01); *Y10T 29/49238* (2015.01)

(58) Field of Classification Search
CPC .. F01B 31/00; F16M 5/00; F16M 1/00; Y10T 29/49238; F04B 35/06; F04B 41/02;
(Continued)

(56) References Cited

U.S. PATENT DOCUMENTS

| 810,670 A | * | 1/1906 | Prellwitz ................. F25B 39/04 165/132 |
| 1,705,546 A | * | 3/1929 | Shipley ................... F25B 39/04 165/174 |

(Continued)

FOREIGN PATENT DOCUMENTS

| DE | 10261274 A1 * | 7/2004 | ............... F16M 5/00 |
| DE | 102009052748 A1 * | 5/2011 | ............... F16M 1/00 |

(Continued)

OTHER PUBLICATIONS

Translation of EP 1764542 A1.*
(Continued)

*Primary Examiner* — Kenneth J Hansen
*Assistant Examiner* — Jon Hoffmann

(57) ABSTRACT

Apparatus (10) and a method for supporting one or more turbomachines, with the apparatus including a first package (12) module including a first frame (32) and a fluid-handling machinery mount coupled to the first frame, the fluid-handling machinery mount being configured to support one or more fluid-handling machines (42). The apparatus also includes a second package module (14) including a second frame (38) and a heat exchanger mount coupled to the second frame, the heat exchanger mount being configured to support one or more process fluid coolers (46), and the second package module being coupled to the first package module. The apparatus further includes an access passage (16) extending between the first and second modules and configured to enable personnel to proceed therethrough.

20 Claims, 6 Drawing Sheets

(51) Int. Cl.
  *F16M 1/00* (2006.01)
  *F16M 5/00* (2006.01)
(58) Field of Classification Search
  CPC ........ F04B 35/04; F04B 17/06; F04D 25/084;
        F04D 13/00; F04D 13/14; F04D 25/00;
        F04D 25/16
  USPC .......... 417/234; 248/346.01, 346.02, 346.03,
        248/639, 637, 678, 670, 672; 52/79.12,
        52/650.3
  See application file for complete search history.

(56) References Cited

U.S. PATENT DOCUMENTS

| | | | | |
|---|---|---|---|---|
| 3,817,347 | A * | 6/1974 | Spencer | E04G 1/00 182/115 |
| 3,871,478 | A * | 3/1975 | Bushnell, Jr. | E04G 1/22 182/148 |
| 4,136,432 | A * | 1/1979 | Melley, Jr. | B60P 3/00 29/469 |
| 4,438,638 | A * | 3/1984 | Hays | F01D 1/32 60/651 |
| 4,676,339 | A * | 6/1987 | Rybka | B66C 19/002 182/142 |
| 4,867,274 | A * | 9/1989 | Langer | E04G 7/307 182/186.8 |
| 4,992,669 | A * | 2/1991 | Parmley | F01B 1/12 123/2 |
| 5,135,077 | A * | 8/1992 | Shalders | E04G 1/14 182/118 |
| 5,626,468 | A * | 5/1997 | Muir | F04B 35/002 248/639 |
| 6,102,157 | A * | 8/2000 | Goldbach | B05B 13/005 182/128 |
| 6,539,972 | B1 * | 4/2003 | Benner | B21B 31/00 137/343 |
| 6,679,025 | B1 * | 1/2004 | Cornell | E04H 5/02 52/122.1 |
| 6,916,375 | B2 * | 7/2005 | Molnar | B60P 3/14 118/302 |
| 2003/0175429 | A1 * | 9/2003 | Molnar | B60P 3/14 427/307 |
| 2005/0063829 | A1 * | 3/2005 | Hendrix | F04B 35/06 417/36 |
| 2007/0130765 | A1 * | 6/2007 | Husted | F04B 35/06 29/888.02 |
| 2007/0134104 | A1 * | 6/2007 | Husted | F04B 35/06 417/360 |
| 2008/0178537 | A1 * | 7/2008 | Spangler | B23P 21/00 52/36.1 |
| 2009/0304496 | A1 * | 12/2009 | Maier | F04D 29/083 415/121.2 |
| 2010/0021292 | A1 * | 1/2010 | Maier | F04D 29/701 415/208.1 |
| 2010/0038309 | A1 * | 2/2010 | Maier | B01D 45/14 210/512.3 |
| 2016/0325403 | A1 * | 11/2016 | Lyras | B24C 9/006 |

FOREIGN PATENT DOCUMENTS

| | | | | |
|---|---|---|---|---|
| EP | | 1764542 A1 * | 3/2007 | ............ F01D 25/28 |
| WO | WO 2007060158 A1 * | | 5/2007 | ............... E04H 7/30 |

OTHER PUBLICATIONS

Translation of DE 102009052748 A1.*
Translation of WO 2007060158 A1.*
Translation of DE 10261274 A1.*
NPL, 14111268-Sulzer-DieselHydraulicDrivenPumpingUnitFirefighting—Aug. 2008.*
NPL, 14111268-DATUM_ICS_flier—2009.*
NPL, 14111268—DOE-HDBK-1140-2001—pp. 117-118, which is The Handbook DOE-HDBK-1140-2001 Human Factors/ Ergonomics Handbook for the Design for Ease of Maintenance, Figure3.1.2. Mobile workspace dimensions.*

* cited by examiner

COMPACT PACKAGE DESIGN FOR COMPRESSION SYSTEM

CROSS-REFERENCE TO RELATED APPLICATIONS

The present application is a national stage application of PCT Pat. App. No. PCT/IB2011/001045, filed Apr. 13, 2011, the contents of which are incorporated herein by reference to the extent consistent with the present disclosure.

BACKGROUND

Packaging designs for turbomachine systems, such as large-scale compression systems, are used to house one or more fluid-handling machines (e.g., compressors), drivers, pipes and other tubing, heat exchangers, and various other components to support the operation of the fluid-handling machines. One example of such a packaging design is described in commonly-assigned U.S. Patent Application having Publication No. 2010/0090087, the entirety of which is incorporated herein by reference to the extent the incorporated disclosure is consistent with the present disclosure.

In most locations where large-scale compression systems are implemented, space is at a premium. As such, reducing the size of traditional package designs is desired; however, such size reductions can lead to challenges. For example, in some instances, the packaging design can become so compact that maintenance is difficult, requiring substantial disassembly and re-assembly efforts to access and maintain the affected components. Such disassembly and re-assembly is time-consuming and, therefore, expensive. However, best practices as well as international standards, such as those promulgated by NORSOK and/or other regulatory authorities, often require relatively routine maintenance of the various components to ensure safe, clean operation of the turbomachine system, while still maintaining sound ergonomics and avoiding risk to the safety of the maintenance personnel. Thus, there is a need for a packaging design for a turbomachine system that facilitates rapid maintenance of the components of the compression system, but still occupies a desirably small footprint.

SUMMARY

Embodiments of the disclosure may provide an exemplary apparatus for supporting one or more turbomachines. The apparatus may include a first package module including a first frame and a fluid-handling machinery mount coupled to the first frame, the fluid-handling machinery mount being configured to support one or more fluid-handling machines. The apparatus may also include a second package module including a second frame and a heat exchanger mount coupled to the second frame, the heat exchanger mount being configured to support one or more process fluid coolers, and the second package module being coupled to the first package module. The apparatus may further include an access passage extending between the first and second modules and configured to enable personnel to proceed therethrough.

Embodiments of the disclosure may also provide an exemplary method for maintaining a compression system. The method may include entering an access passage of the compression system, the access passage being disposed between a compressor package module and a process package module, with the compressor package module including one or more compressors mounted therein and the process package module including one or more process fluid coolers mounted therein. The method may also include proceeding at least partially through the access passage to arrive at a maintenance location. The method may further include performing maintenance on one or more components of the compression system.

Embodiments of the disclosure may further provide an exemplary turbomachine package. The turbomachine package may include a compressor package frame, a process package frame disposed parallel to the compressor package frame and coupled thereto, and an access passage disposed between the compressor package frame and the process package frame and extending parallel to both. The turbomachine package may also include one or more compressors disposed at least partially within the compressor package frame, coupled thereto, and oriented parallel to the access passage, and one or more rotary separators coupled to at least one of one or more the compressors. The turbomachine package may further include one or more process fluid coolers disposed at least partially in the process package frame and coupled thereto, each of the one or more process fluid coolers being in fluid communication with at least one of the one or more compressors.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
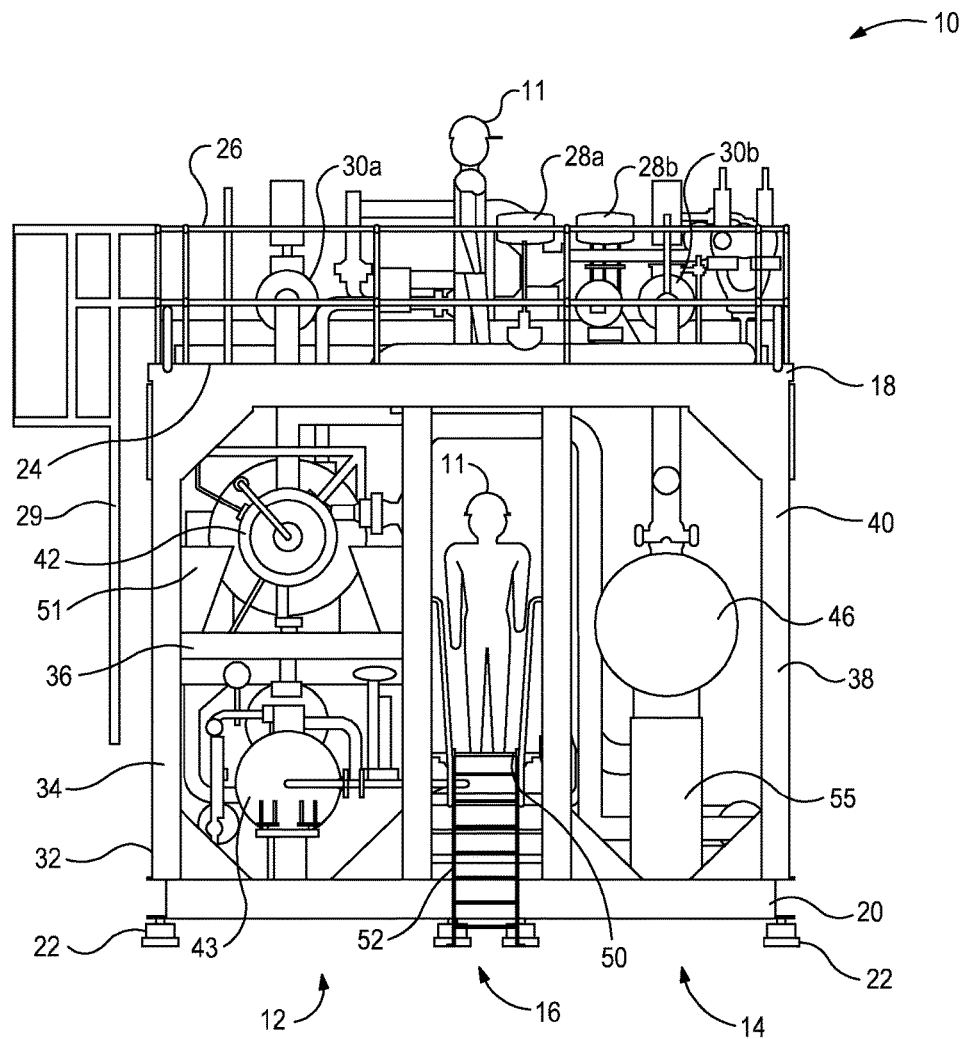
FIG. 1 illustrates an end elevation view of an exemplary turbomachine package, in accordance with one or more aspects of the disclosure.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 2:
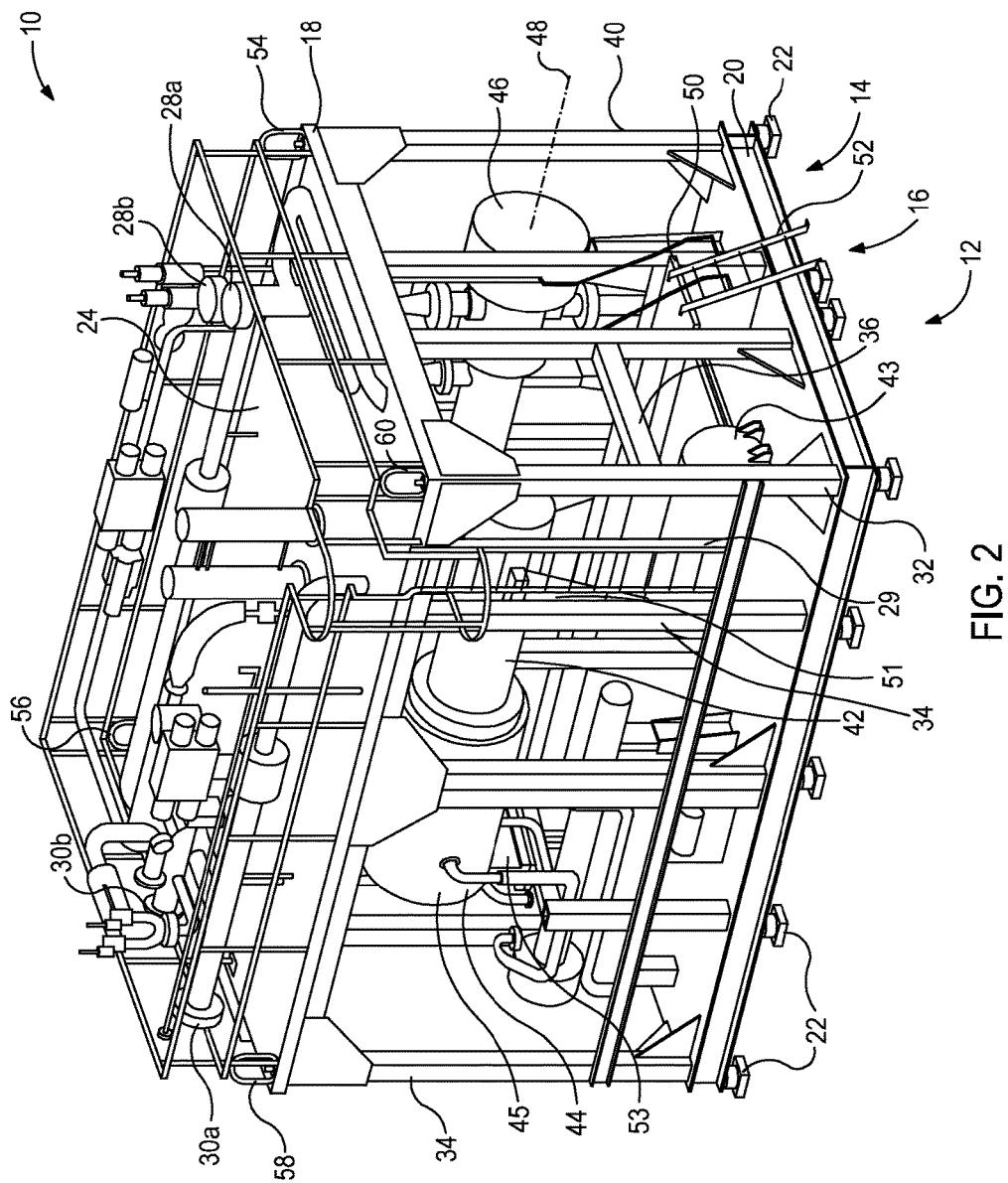
FIG. 2 illustrates a raised perspective view of the exemplary turbomachine package, in accordance with one or more aspects of the disclosure.

FIGS. 1 and 2 illustrate an elevation view and a raised perspective view, respectively, of a turbomachine package 10, according to one or more embodiments. It will be appreciated that none of the figures are necessarily drawn to scale and the relative size and positioning of the various components may vary. The turbomachine package 10 is modular and, thus, includes at least a compressor package module 12 and a process package module 14. Although not shown, additional modules may be coupled to the turbomachine package 10 as desired to expand the functionality of the turbomachine package 10. The compressor package module 12 and the process package module 14 each include a frame, for example, a first frame 32 and a second frame 38, respectively. The frames 32, 38 may be mechanically fastened together. Accordingly, the modules 12, 14 may be securely coupled together, but also rapidly disconnectable from each other.

Further, an access passage 16 is defined generally between the two modules 12, 14. The access passage 16 provides internal service access to the various components of the turbomachine package 10, which are housed and/or supported in the modules 12, 14. The combination of the access provided by the access passage 16 and the access available from the exterior of the turbomachine package 10 through the frames 32, 38 results in substantially all of the components of the turbomachine package 10 being ergonomically reachable without significant disassembly of surrounding components.

Lift connectors 54, 56, 58, 60 are coupled to the frames 32, 38. The lift connectors 54, 56, 58, 60 may be coupled proximal the upper corners of the turbomachine package 10, as shown. This enables the turbomachine package 10 to be lifted as a single unit, for example, by engagement with a crane or other lifting device (none shown). Although not shown, in other embodiments, each module 12, 14 may have its own lift connectors. Accordingly, each module 12, 14 may be separately lifted into place by a smaller lift device than may be required for positioning of the entire turbomachine package 10. Once in place, the frames 32, 38 may be fastened or otherwise connected together. Likewise, an already-assembled turbomachine package 10 may be disassembled by disconnecting the frames 32, 38, with each module 12, 14 then being individually moveable. Accordingly, one module 12, 14 may be taken off-line for maintenance and replaced with a back-up module without having to remove and replace the entire turbomachine package 10. To support this modularity, the various pipe connections, electrical connections, etc. may be of standard size and configured to be releasably secured together, such as with single-side flanged connections.

Referring now to the illustrated embodiment of the turbomachine package 10 in further detail, the turbomachine package 10 generally includes one or more fluid-handling machines, for example, a compressor 42. In an embodiment, the compressor 42 may be a centrifugal compressor, for example, one of the DATUM®-type compressor systems, which are commercially-available from Dresser-Rand Company of Olean, N.Y. Although the turbomachine package 10 is generally described herein in terms of a compression system, it will be appreciated that the turbomachine package 10 may be advantageously employed with any type of turbomachine. Accordingly, the compressor 42 may be substituted with any type of fluid-handling machine, including one or more turbines, expanders, fans, blowers, pumps, or any other machine that transfers energy between a rotor and a fluid, without departing from the scope of this disclosure.

The turbomachine package 10 further includes a driver 44 operatively coupled to the compressor 42, and one or more process fluid coolers 46. It will be appreciated that additional process coolers, disposed in the same or different configurations and having the same or different structure as those described below with reference to process cooler 46, may be employed without departing from the scope of the disclosure. The driver 44 may be an electric motor, a steam or gas turbine, a gas engine, or the like. The compressor 42 and the driver 44 may be disposed within a casing 45, which may, in at least one embodiment, be hermetically sealed. In other embodiments, however, the compressor 42 and the driver 44 may be disposed in separate casings or in a casing 45 that is not hermetically sealed. The process fluid cooler(s) 46 may each be a shell-and-tube heat exchanger, a printed circuit heat exchanger ("PCHX"), a direct contact heat exchanger, a trim cooler, a mechanical refrigeration unit, combinations thereof, or any other type of heat exchanger.

The compressor 42, driver 44, process fluid cooler(s) 46, and associated components (e.g., valves, fittings, controls, filters, pipes, tubing, etc.) are arranged in a convenient and compact assembly, as shown. Accordingly, the turbomachine package 10 may be modular, for example, having the aforementioned compressor package module 12, which may also be referred to as a "first" package module 12, and the process package module 14, which may also be referred to as a "second" package module 14. The modules 12, 14 may extend generally parallel to one another, for example, side-by-side, as shown. The modules 12, 14 may be broken into smaller modules (not shown) as desired. Moreover, additional modules (not shown) may be added to the turbomachine package 10 as desired to provide increased and/or additional functionality.

The access passage 16 is defined between the modules 12, 14. The access passage 16 is sized to allow personnel 11 to enter and, for example, traverse the access passage 16 by walking or otherwise proceeding therethrough. In an embodiment, such traversal does not require substantial disassembly of the turbomachine package 10 (e.g., no or substantially no removal of tubing, pipes, fluid-handling machinery, etc.). In various embodiments, the width of the access passage 16 may be from about 0.25 meters, about 0.5 meters, 0.75 meters, or about 1 meter to about 1.5 meters, about 1.75 meters, about 2.0 meters, or larger, as desired to facilitate movement of personnel 11 therein. The height of the access passage 16 may be any height generally suitable to allow passage of personnel 11 therethrough and to allow access to one or more of the compressor 42, the driver 44, and/or the process fluid cooler(s) 46. For example, the height of the access passage 16 may be between about 1.5 meters, about 2 meters, about 4 meters, or about 6 meters and about 6.5 meters, 8 meters, about 10 meters, about 15 meters, or more.

The turbomachine package 10 also includes a top 18 and a bottom 20, which may each include one or more beams, defining a generally rectangular top 18 and bottom 20, for example, of the respective module or of the combined modules 12, 14. The top 18 and/or bottom 20, however, may define other geometries and may not be the same shape. In an embodiment, as shown, the top 18 and bottom 20 extend across the compressor package module 12, the access passage 16, and the process package module 14. Accordingly, the top 18 and bottom 20 may couple the modules 12, 14 together such that a single, rigid frame structure is formed. In other embodiments, however, one or both of the top 18 and/or the bottom 20 may be segmented or otherwise separated into two or more parts such that the compressor package module 12 and the process package module 14 are independent and/or separable in their entireties. In some embodiments, the top 18 and bottom 20 may be affixed to the modules 12, 14 subsequent to the modules 12, 14 being disposed at their desired locations.

One or more mounts 22 may be fixed to the bottom 20 to support the modules 12, 14 as they rest on the ground or another stationary surface. In various embodiments, these mounts 22 may be antifriction mounts, as are generally known in the art. In other embodiments, some or all of the mounts 22 may be any other suitable mount. In still other embodiments, the turbomachine package 10 may be suspended from the ground, disposed with the bottom 20 flush against the ground, or disposed on wheels, on stilts, or in any other configuration in which some or all of the mounts 22 are unnecessary and may be omitted.

An upper platform 24 may be disposed on the top 18 and configured to support personnel for access to the components on the top 18 of the system 10. The upper platform 24 may be disposed at an elevated position with respect to the bottom 20. A safety rail 26 may extend about the periphery of the upper platform 24. One or more valves, for example, valves 28a, 28b, which may be representative of seal gas system valves, process fluid valves, cooling fluid valves, or the like, may be disposed proximal the upper platform 24. Further, one or more process fluid connections 30a, 30b, as well as various other components of the turbomachine package 10, such as filters, tubular, pipes, or even machinery, may also be disposed proximal the upper platform 24. Accordingly, the upper platform 24 may provide easy, ergonomic, and safe access to such components. An access ladder 29, which may instead be stairs, an elevator, or the like, is provided to allow maintenance personnel 11 to access to the upper platform 24. The access ladder 29 extends upward to the upper platform 24 from an accessible, but elevated, position proximal the periphery of the bottom 20. In other embodiments, the access ladder 29 may extend all the way to the bottom 20 and may be adjustable in height.

The compressor package module 12 includes the first frame 32, which may also be referred to as the compressor package frame 32. The compressor package frame 32 may include one or more vertically-oriented support beams 34 extending between the top 18 and the bottom 20, part of the top 18 and part of the bottom 20, and one or more crossbeams 36. The beams 34, 36, the top 18, and the bottom 20 are connected together via any suitable process or device to form the compressor package frame 32, such as by welding, brazing, mechanically-fastening, combinations thereof, or the like. Similarly, the process package module 14 includes the second frame 38, which may also be referred to as the process package frame 38. The process package frame 38 may include one or more vertically-oriented support beams 40, part of the top 18, and part of the bottom 20, and may also include one or more cross-beams (not shown). The beams 40, the top 18, and the bottom 20 may also be connected together via any suitable connecting process or device to form the process package frame 38.

The compressor 42 is disposed in the compressor package module 12 and is mounted to the compressor package frame 32. In an embodiment, the compressor 42 is elevated from the bottom 20, providing space for a liquid drain vessel 43 in the compressor package module 12. The liquid drain vessel 43 is also mounted to the compressor package frame 32.

The compressor package module 12 may also include various heaters, heat exchangers, valves, fittings, pipes, tubing, and/or the like, as necessary. Accordingly, the compressor package module 12 may be configured to supply the driver 44 with electricity or pressurized fluid to power the compressor 42. Further, the compressor package module 12 may be configured to provide the driver 44 with lubrication fluid, as needed, seal gas for bearings disposed therein, and/or anything else required for proper operation of the driver 44. The compressor package module 12 may also be configured to provide the compressor 42 with seal gas, lubrication fluid, and process fluid for compression and/or separation, and/or anything else required for proper operation of the compressor 42.

The one or more process fluid coolers 46 may be configured to receive a flow of cooling water to cool the process fluid before and/or after the process fluid is compressed by the compressor 42. For example, the process fluid cooler 46 defines a central axis 48 about which it is disposed. In an embodiment, as shown, the central axis 48 is horizontally-oriented, that is, generally parallel to at least one of the top 18 and/or bottom 20. It will be appreciated, however, that the terms "horizontally-oriented" and "horizontal orientation," as they are used herein, do not require precise and complete parallel orientation with respect to the top 18 and/or bottom 20. Indeed, variations from parallel are contemplated herein as being within the definitions of "horizontally-oriented" and "horizontal orientation."

Figure 3:
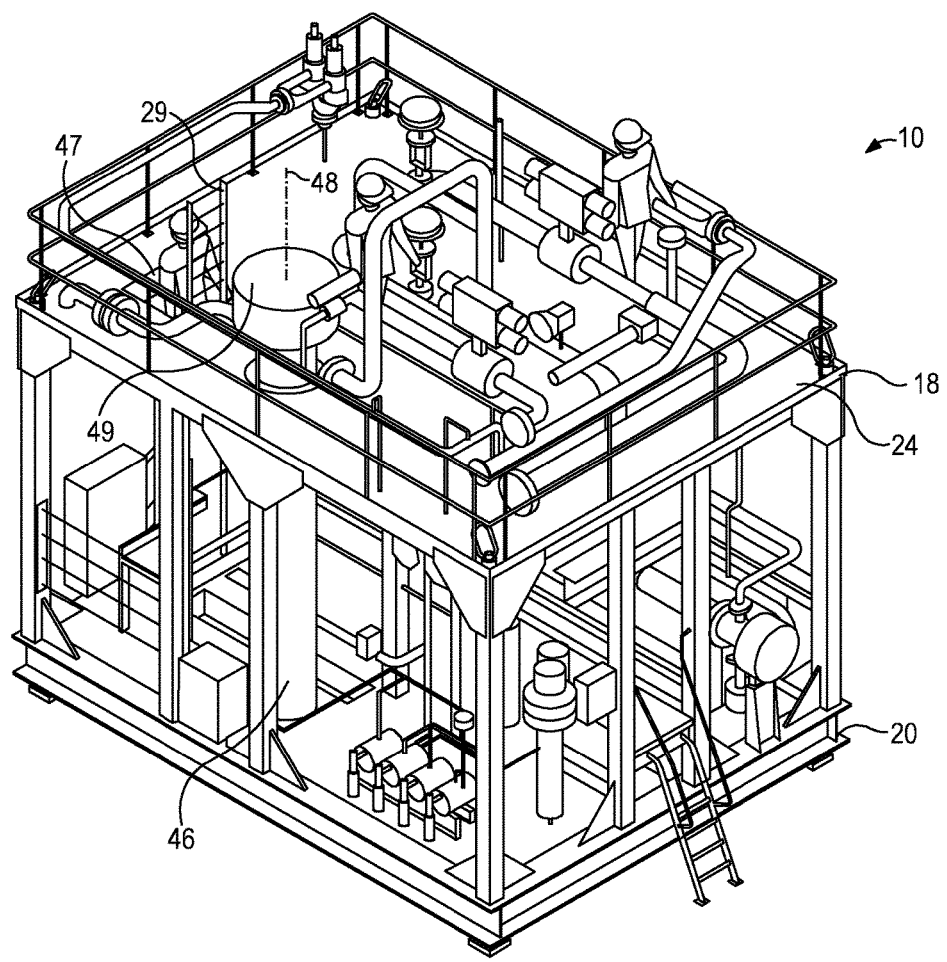
FIG. 3 illustrates a raised perspective view of another embodiment of the exemplary turbomachine package, in accordance with one or more aspects of the disclosure.

In various embodiments, the process fluid cooler 46 and/or any additional process fluid coolers (not shown) may be disposed at various other orientations. For example, FIG. 3 illustrates a perspective view of another embodiment of the turbomachine package 10, with the depicted process fluid cooler 46 being rotated about 90 degrees from the process fluid cooler 46 shown in FIGS. 1 and 2. Although not shown, one or more additional process fluid coolers may be employed along with process fluid cooler 46, with these additional process fluid coolers being either in the horizontal or in a rotated orientation.

The central axis 48 of the illustrated process fluid cooler 46 is vertically-oriented; that is, generally orthogonal to the planes defined by the top 18 and the bottom 20. Vertically orienting the process fluid cooler 46, and/or any additional process fluid coolers (not shown), may reduce the footprint of the turbomachine package 10. It will be appreciated that some deviations from orthogonal are expected and are within the definition of "vertically-oriented" and "vertical orientation" as the terms are used herein. Moreover, in such a vertical orientation, an end 49 of the process fluid cooler 46 (and/or of any additional process fluid coolers) may protrude through the upper platform 24, providing easy maintenance access to the end 49. In other embodiments, the end 49 may reside below the upper platform 24. Although horizontal and vertical orientations are illustrated, the process fluid cooler 46 and/or any additional process fluid coolers (not shown) may be disposed at any suitable orientation. Additionally, as illustrated in FIG. 3, the access ladder 29 may extend to the upper platform 24 through a port 47 defined therein.

Referring again to FIGS. 1 and 2, the compressor 42 is coupled to the compressor package frame 32 via one or more fluid-handling machinery mounts 51, which are also referred to herein as compressor mounts 51. The compressor mounts 51 may be coupled to one or more of the vertical support beams 34, as shown, but in other embodiments may be coupled to a cross-beam 36, the top 18, the bottom 20, or a combination thereof. Similarly, the driver 44 is coupled to the compressor package frame 32 via one or more driver mounts 53. The driver mounts 53 may be coupled to one of the cross-beams 36, as shown, but in other embodiments may be coupled to any other part of the compressor package frame 32. Likewise, as best shown in FIG. 1, the depicted process fluid cooler 46 is coupled to the process package frame 38 via one or more heat exchanger mounts 55. The mounts 51, 53, 55 may be flexible, such that they resist transmitting vibration from the component to which they are attached, rigid so as to constrain vibration, or may be a combination of flexible and rigid mounts.

The compressor 42, driver 44, and liquid drain vessel 43 may be generally positioned in the same plane in the compressor package module 12, such that the compressor package module 12 is relatively long and narrow. Such positioning provides easy access to the components via the access passage 16. Similarly, the position of the process fluid cooler(s) 46 may also allow for a narrow process package module 14, providing access thereto via the access passage 16.

Further, the turbomachine package 10 includes a platform 50 extending through the access passage 16. As shown, the access passage 16 may be raised and accessible with a ladder 52, an elevator, or the like. Additionally, the platform 50 may be configured to move from a low-position, proximal the bottom 20, across a range of elevations with respect to the bottom 20, thereby facilitating vertical access to the various components of the turbomachine package 10, and may obviate any need for ladders within the access passage 16. Various devices capable of lifting the platform 50 are known and may include scissor lifts, pulley systems, hydraulic systems, and rack-and-pinion systems, screws, and the like. Further, in some embodiments, the platform 50 may be capable of being lowered until it abuts, or nearly abuts, the bottom 20, thereby allowing the ladder 52 to be omitted.

As best shown in FIG. 2, the lift connectors 58, 60 are connected to the top 18, above the compression package module 12, and the lift connectors 54, 56 are connected to the top 18, above the process package module 14. In other embodiments, the lift connectors 54, 56, 58, 60 may be connected to other parts of the compressor package frame 32 and/or the process package frame 38. The lift connectors 54, 56, 58, 60 are configured to engage a lift device, for example, by receiving hooks coupled to a crane (not shown). The crane thus couples with the lift connectors 54, 56, 58, 60 and lifts the turbomachine package 10 as a single unit.

Although not shown, in embodiments where the top 18 and bottom 20 are divided, or affixed only after moving the modules 12, 14 into position, each module 12, 14 may include three or more lift connectors coupled thereto. Accordingly, in applications where the turbomachine package 10 is too heavy for a lift mechanism on hand to lift, the modules 12, 14 may be lifted individually and connected together once situated at a desired location. To facilitate this modularity, the fluidic and/or electrical connections of the turbomachine package 10 may be of standard size and configured to rapidly connect and disconnect, enabling a virtually "plug-and-play" assembly for the turbomachine package 10.

Figure 4:
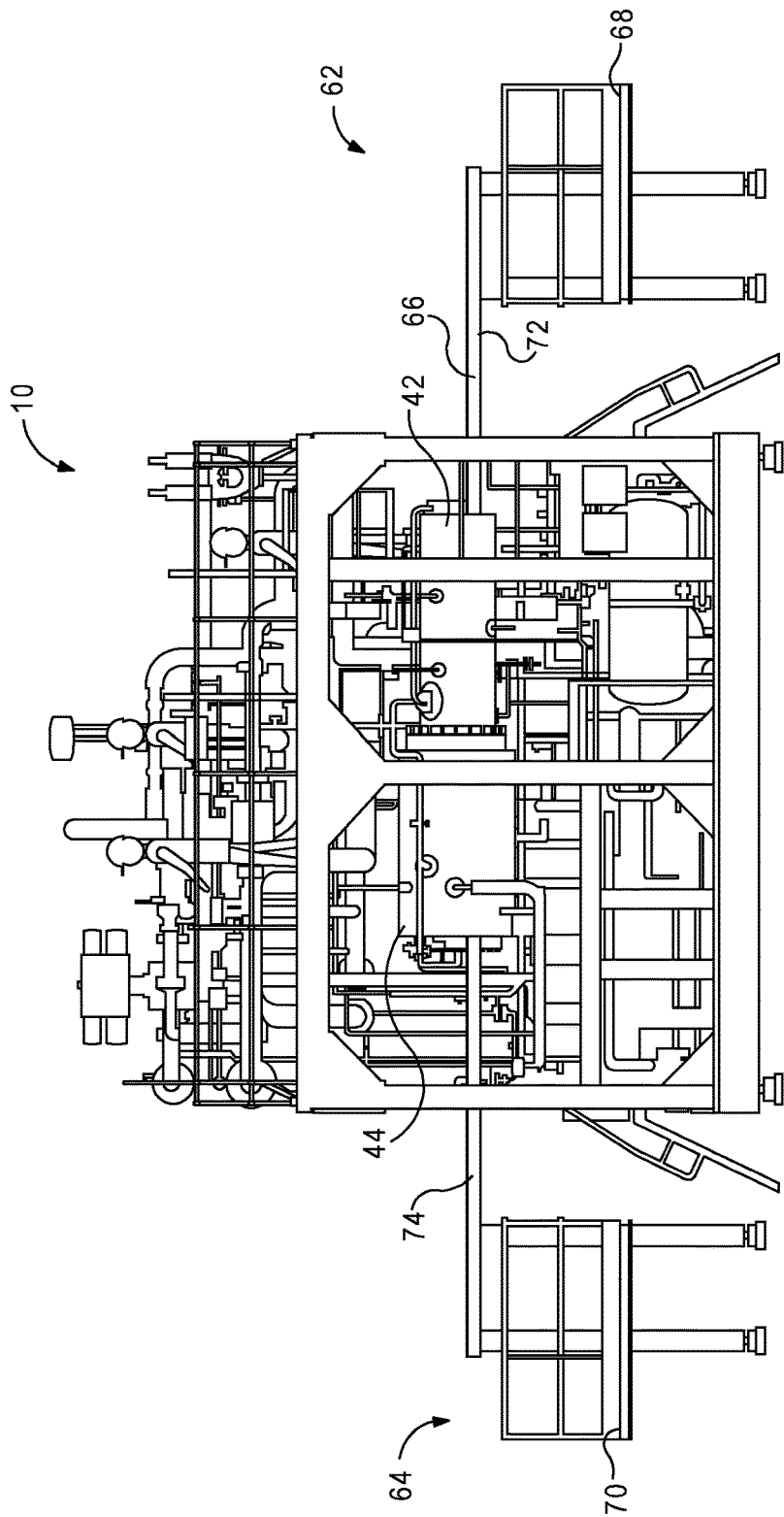
FIG. 4 illustrates a side elevation view of the turbomachine package of FIG. 3, additionally illustrating exemplary maintenance assemblies, according to one or more aspects of the disclosure.

FIG. 4 illustrates a side elevation view of the turbomachine package 10, according to one or more embodiments. As shown, the turbomachine package 10 may include a pair of permanent or removable maintenance assemblies 62, 64, which are disposed on opposite sides of the access passage 16 (FIGS. 1 and 2). An access platform 66 may extend through the access passage 16, between the maintenance assemblies 62, 64. The maintenance assemblies 62, 64 may have an elevating device (not shown) capable of raising and lowering the access platform 66. Accordingly, the access platform 66 may be stationary or adjustably-positioned at the optimal height with respect to the component of the turbomachine package 10 requiring maintenance. Each maintenance assembly 62, 64 may also include a platform 68, 70, which may be accessed via a ladder, stairs, or the like (not shown). The platforms 68, 70 may function as an elevator to enable access to the raised access platform 66, for a better observation perspective, for mounting equipment, or the like.

In other embodiments, one or both of the maintenance assemblies 62, 64 may be aligned with the compressor 42 and/or the driver 44. As such, the access platform 66 may be split into a pair of platforms 72, 74 providing access to an axial end of the compressor 42 and an axial end of the driver 44 or to either axial ends of the process fluid cooler(s) 46 (see FIGS. 1-3). In such an embodiment, the compressor 42 may have a removable closure device at the axial end, which may be opened to expose an internal compression assembly of the compressor (not shown). Such closure device and internal compression assembly may be similar to those described in commonly-assigned U.S. Pat. No. 7,850,427, the entirety of which is incorporated herein by reference, to the extent not inconsistent with this disclosure. For example, the internal compression assembly may include one or more impellers (not shown) of the compressor 42. Accordingly, the internal compression assembly may be removed via the axial end and supported on the platform 72. It will be appreciated that such internal compression assemblies may be serviced via the single access platform 66 embodiment as well.

Figure 5:
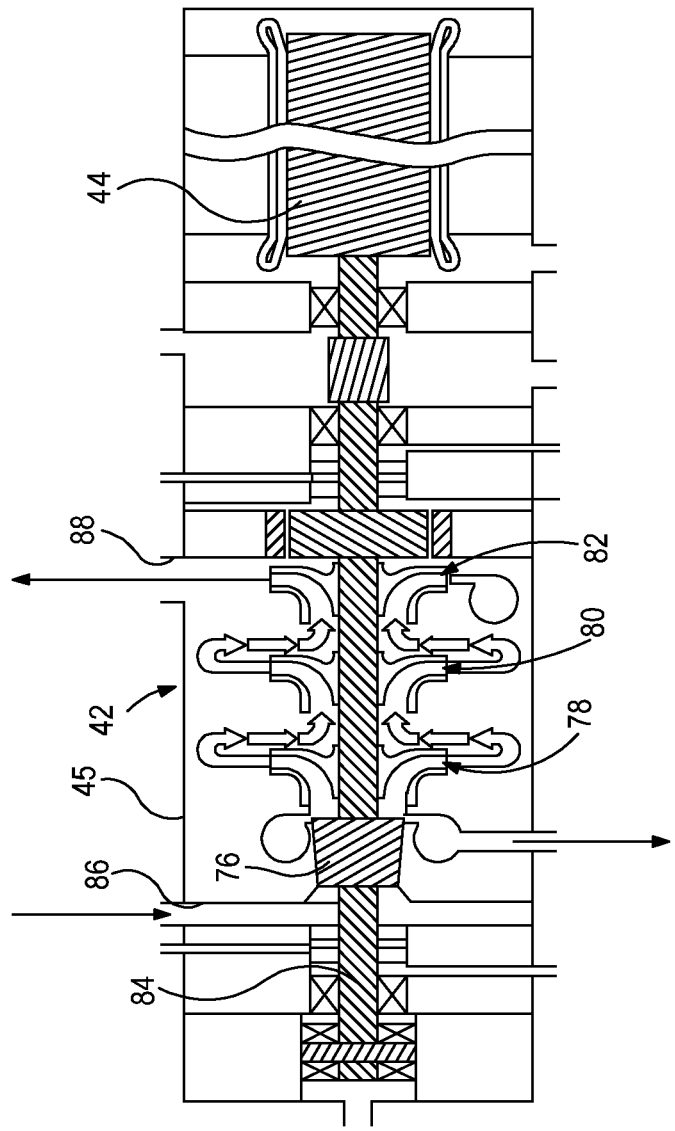
FIG. 5 illustrates a schematic view of an exemplary compressor, driver, and separator for use in an embodiment of the turbomachine package, according to one or more aspects of the disclosure.

FIG. 5 illustrates a simplified schematic view of an embodiment of the compressor 42 and the driver 44. As shown, a rotary separator 76 may be coupled to one or more compression stages (three shown: 78, 80, 82) via a shaft 84. The rotary separator 76 may include a generally cylindrical drum. Further, the shaft 84 may also be coupled to the driver 44, which turns the shaft 84, thereby turning the compression stages 78, 80, 82, and the rotary separator 76. Accordingly, fluid may enter the compressor 42 via an inlet 86 and then be directed to the rotary separator 76 for separation of higher-density components therefrom. The separated fluid then proceeds to the compression stages 78, 80, 82 where it is compressed, and subsequently discharged via outlet 88.

It will be appreciated, however, that although many embodiments of a turbomachine package 10 include a compressor 42 having a rotary separator 76 coupled thereto, many others omit the rotary separator 76. Moreover, in some embodiments, the turbomachine package 10 may replace the rotary separator 76 with a static separator (e.g., a swirl tube or a gravitational separator). In still other embodiments, the turbomachine package 10 may position the rotary separator 76 outside of the compressor casing 45, either on the shaft 84, on a different shaft (not shown). In some embodiments, the rotary separator 76 may not be disposed on a driven shaft at all, for example, being driven by converting some of the pressure of the fluid flow therethrough into rotational kinetic energy. All such embodiments are expressly contemplated herein for use with the turbomachine package 10 of any of FIGS. 1-4.

Referring again to FIGS. 1-4, the turbomachine package 10 disclosed herein provides the desired combination of compact design and ease of maintenance. For example, the turbomachine package 10 may reduce the footprint of traditional turbomachine packages by between about 40 and about 50 percent. However, by providing an access passage 16 between two optionally-disconnectable modules 12, 14, and positioning the components of the turbomachine package 10 as disclosed herein, gains at least in maintainability are realized.

Figure 6:
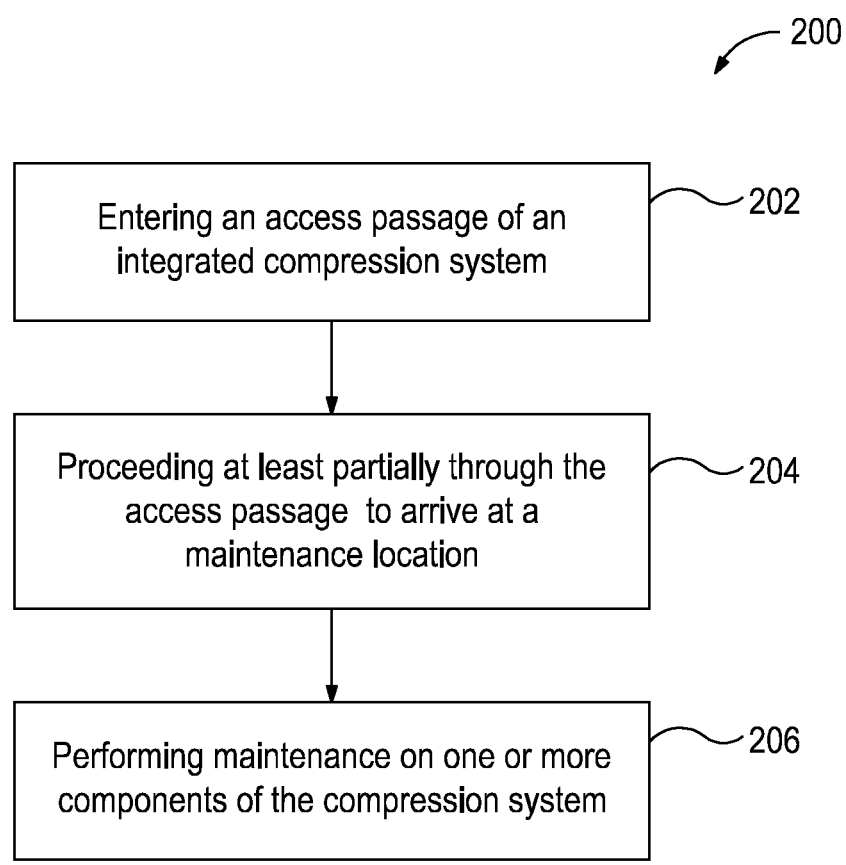
FIG. 6 illustrates a flowchart of an exemplary method for maintaining a compression system, according to one or more aspects of the disclosure.

FIG. 6 illustrates a flowchart of an exemplary method 200 for maintaining a compression assembly. The method 200 may proceed by operation of the turbomachine package 10 described above with reference to FIGS. 1-5. Accordingly, the method 200 may be more completely understood with reference thereto. The method 200 may include entering an access passage of a package supporting the compression system, as at 202. In an embodiment, the access passage is disposed between a compressor package module and a process package module, with the compressor package module including a compressor and the process package module including a process fluid cooler. Further, the compressor package module may include a compressor package frame in which the compressor is at least partially disposed, and the process package module may include a process package frame in which the gas cooler is at least partially disposed.

The method 200 may also include proceeding at least partially through the access passage to arrive at a maintenance location, as at 204. Further, arriving at the maintenance location may include riding an elevating platform from a low position, for example, proximal a bottom of the package, to an elevated position. This may allow maintenance personnel to be positioned at the optimal height to perform maintenance on one or more components of the integrated compression system.

The method 200 may also include performing maintenance on one or more components of the compression system, as at 206. In an embodiment, performing maintenance may include disposing a pair of maintenance assemblies at opposing ends of the integrated compression system. Performing maintenance may also include extending a platform through the access passage and between the pair of maintenance assemblies. Performing maintenance may further include adjusting the height of the platform with the pair of maintenance assemblies, and removing the maintenance assemblies and the platform after performing maintenance. Additionally or instead, performing maintenance may include removing an axial end closure device of the compressor and extracting an internal compression assembly at least partially from a casing of the compressor. In such case, performing maintenance may also include performing maintenance on the internal compression assembly.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. An apparatus for supporting one or more turbomachines, comprising:
 a plurality of fluid-handling machines;
 a plurality of process fluid coolers;
 a first package module including a first frame and a fluid-handling machinery mount coupled to the first frame, the fluid-handling machinery mount being configured to support the plurality of fluid-handling machines;
 a second package module including a second frame and a heat exchanger mount coupled to the second frame, the heat exchanger mount being configured to support the plurality of process fluid coolers, and the second package module coupled to the first package module;
 an access passage extending through the apparatus between the first and second package modules and defining a space separate from respective interior spaces defined by the first and second package modules, the access passage configured to enable personnel to proceed through the access passage to reach, from the access passage into the respective interior spaces defined by the first and second package modules, to at least some of the plurality of fluid-handling machines of the first package module, and to at least some of the plurality of process fluid coolers of the second package module,
 wherein a bottom of the access passage is coplanar with each of a bottom of the first package module and a bottom of the second package module, and a top of the access passage is coplanar with each of a top of the first package module and a top of the second package module; and
 an elevated platform extending through the access passage and configured to transport personnel disposed thereon and moveable in the access passage between a low position proximal to and above the bottom of the access passage and an elevated position distally away from the bottom of the access passage and below the top of the access passage.

2. The apparatus of claim 1, wherein the first and second package modules with the access passage defined therebetween are configured to be lifted together as a single unit.

3. The apparatus of claim 2, further comprising lift connectors coupled to at least one of the first and second frames, the lift connectors being configured to engage a lift device to move the first and second package modules together.

4. The apparatus of claim 1, wherein the first and second package modules are releasably coupled together and configured to be separately moveable.

5. The apparatus of claim 4, further comprising:
first lift connectors coupled to the first frame and configured to engage a lift device to move the first package module separately from the second package module; and
second lift connectors coupled to the second frame and configured to engage the lift device to move the second package module separately from the first package module.

6. The apparatus of claim 1, wherein the access passage has a width of between 1 meter and 2 meters and a height of between 4 meters and 15 meters.

7. The apparatus of claim 1, further comprising an upper platform disposed above at least one of the fluid-handling machinery mount and the heat exchanger mount, the upper platform being coupled to at least one of the first frame and the second frame and configured to provide access to one or more process fluid connections of one or more turbomachines.

8. The apparatus of claim 1, wherein the plurality of fluid-handling machines includes a plurality of compressors.

9. The apparatus of claim 1, wherein the heat exchanger mount is configured to support the plurality of process fluid coolers in a vertical orientation.

10. The apparatus of claim 1, further comprising:
one or more maintenance assemblies disposed proximal a side of at least one of the first and second package modules; and
an access platform extending from the one or more maintenance assemblies and at least partially through the access passage.

11. The apparatus of claim 10, wherein the one or more maintenance assemblies are easily removable when not in use.

12. The apparatus of claim 10, wherein the one or more maintenance assemblies are configured to elevate the access platform across a range of elevations.

13. A method for maintaining a compression system, comprising:
entering an access passage of the compression system, the access passage extending through the compression system and being disposed between a compressor package module and a process package module and defining a space separate from respective interior spaces defined by the compressor package module and the process package module, the compressor package module including a plurality of compressors mounted therein and the process package module including a plurality of process fluid coolers mounted therein, the access passage being configured to enable personnel to proceed through the access passage to reach, from the access passage into the respective interior spaces defined by the compressor package module and the process package module, to at least some of the plurality of compressors of the compressor package module and to at least some of the plurality of process fluid coolers of the process package module, wherein:
the process package module is coupled to the compressor package module, and
a bottom of the access passage is coplanar with each of a bottom of the compressor package module and a bottom of the process package module, and a top of the access passage is coplanar with each of a top of the compressor package module and a top of the process package module;
proceeding at least partially through the access passage to arrive at a maintenance location, wherein proceeding at least partially through the access passage to arrive at the maintenance location comprises riding an elevating platform movable in the access passage between a low position proximal to and above the bottom of the access passage and an elevated position distally away from the bottom of the access passage and below the top of the access passage to arrive at the maintenance location, the elevating platform being configured to transport personnel disposed thereon; and
performing maintenance on at least one of the plurality of compressors and the plurality of process fluid coolers.

14. The method of claim 13, wherein performing maintenance comprises:
disposing one or more maintenance assemblies at one or both ends of the compression system; and
extending an access platform from the one or more maintenance assemblies and at least partially through the access passage.

15. The method of claim 14, further comprising removing the one or more maintenance assemblies when the one or more maintenance assemblies are not in use.

16. The method of claim 14, further comprising:
adjusting a height of the access platform with the one or more maintenance assemblies; and
removing the one or more maintenance assemblies and the access platform after performing maintenance.

17. A turbomachine package, comprising:
a compressor package frame;
a process package frame disposed parallel and horizontally adjacent to the compressor package frame and coupled thereto;
a plurality of compressors disposed at least partially within the compressor package frame, coupled thereto, and oriented parallel to an access passage;
a plurality of process fluid coolers disposed at least partially in the process package frame and coupled thereto;
the access passage disposed between the compressor package frame and the process package frame and defining a space separate from respective interior spaces defined by the compressor package frame and process package frame, the access passage extending through the turbomachine package parallel to both, the access passage being configured to enable personnel to proceed through the access passage to reach, from the access passage into the respective interior spaces defined by the compressor package frame and process package frame, to at least some of the plurality of compressors disposed in the compressor package frame and coupled thereto, and to at least some of the plurality of process fluid coolers disposed in the process package frame and coupled thereto,
wherein a bottom of the access passage is coplanar with each of a bottom of the compressor package frame and a bottom of the process package frame, and a top of the access passage is coplanar with each of a top of the compressor package frame and a top of the process package frame;

one or more rotary separators coupled to at least one compressor of the plurality of compressors, wherein the plurality of compressors are oriented parallel to the access passage, and each of the plurality of process fluid coolers is in fluid communication with at least one of the plurality of compressors; and an elevated platform extending through the access passage and configured to transport personnel disposed thereon between a low position proximal to and above the bottom of the access passage and an elevated position distally away from the bottom of the access passage and below the top of the access passage.

18. The turbomachine package of claim 17, further comprising:

a bottom; and a top, wherein each of the bottom and the top includes one or more beams that extend across the process package frame, the access passage, and the compressor package frame.

19. The turbomachine package of claim 17, wherein at least one of the plurality of process fluid coolers has a central axis that is vertically-oriented.

20. The turbomachine package of claim 17, further comprising:

first lift connectors coupled to the compressor package frame; and second lift connectors coupled to the process package frame, wherein the compressor package frame and the process package frame are releasably coupled together such that the compressor package frame and the process package frame are configured to be lifted separately.

* * * * *